Jan. 1, 1963     C. B. SKRMETTA     3,070,812

SINK ATTACHMENT

Filed May 9, 1960

INVENTOR,
CECIL B. SKRMETTA

BY *Tasby & Asheroff,*

ATTORNEYS

3,070,812
SINK ATTACHMENT
Cecil B. Skrmetta, 3536 Lowerline St., New Orleans 25, La.
Filed May 9, 1960, Ser. No. 27,800
5 Claims. (Cl. 4—205)

The present invention relates to a sink attachment and more particularly to a sink rinsing attachment which directs the flow of rinsing water directly from the faucet to the drain opening of the sink without disturbing the liquid in the body of the sink.

According to one aspect of the invention, there is provided a rinsing attachment for a sink having a drain opening, said attachment comprising a bowl and a conduit, one end of said conduit being in communication with the interior of the bowl to discharge the contents thereof. The attachment also includes closure means for the sink opening with the other end of the conduit providing communication through the closure means so that when the closure means is positioned over the drain opening, the conduit will discharge the contents of the bowl directly to the drain opening.

According to another aspect of the invention, the bowl is buoyant so that an increase of the height of the liquid in the sink will elevate the bowl, the closure opening the drain of the sink when the bowl is raised above a predetermined level to prevent overflow of the sink. The conduit is preferably a rigid conduit so that it supports the bowl above the closure means. The bowl is mounted vertically offset from the closure means so that the bowl can be positioned under the sink faucet. The bowl is preferably mounted for rotation about an axis substantially coaxial with the drain opening so that the bowl can be swung away from the faucet if desired.

The purpose of the invention is to permit the sink to hold a supply of washing liquid for washing dishes and at the same time permit the dishes to be rinsed without diluting the water in the sink.

These and other aspects of the present invention will be clearly understood from the following description of an exemplary embodiment in connection with the accompanying drawings in which.

Figure 1:
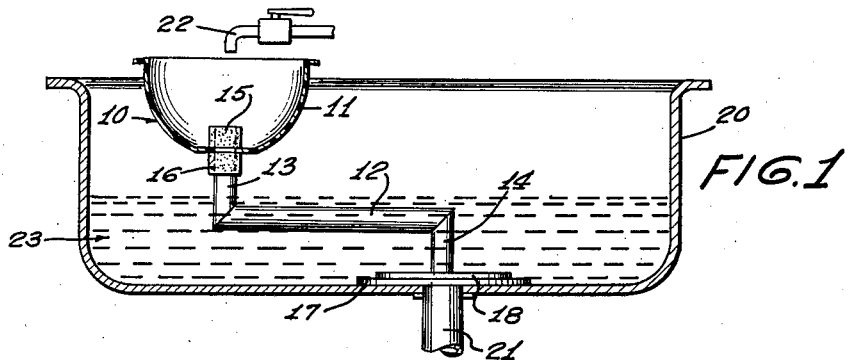
FIGURE 1 is a diagrammatic vertical cross section showing the attachment in its normal position in the sink.

The sink rinsing attachment 10 of the present invention comprises a bowl 11 having a conduit 12, preferably rigid, secured to the bottom thereof for discharging the contents of the bowl 11. The conduit 12 has an upwardly extending portion 13 and a downwardly depending portion 14, the portion 13 extending into the bowl through an opening in the bottom thereof and held in position by means of bushings 15 and 16, said bushings sealing the joint between the bowl and the portion 13 of the conduit 12.

A closure means 17 for the drain opening of the sink is secured to the portion 14 of the conduit 12. The closure means 17 is preferably a flexible, rubber disk of the type generally used to close sink openings. The end of portion 14 of the conduit passes through an opening through closure member 17 and is held in position by means of bushings 18 and 19, the bushings 18 and 19 sealing the end 14 to closure means 17 while preferably permitting closure member 17 to rotate about portion 14 of the conduit.

When using the attachment 10 of the present invention, the attachment 10 is placed in sink 20 with the closure means 17 around drain opening 21 of the sink so that the conduit 12 can discharge the contents of bowl 11 directly into drain opening 21 while at the same time closure means 17 closes the drain opening 21 of the sink so that washing liquid 23 will be retained in the sink. When the bowl 11 is positioned under faucet 22 of the sink, dishes can be rinsed by placing them under the faucet with the rinsing water being conducted directly by means of conduit 12 into drain opening 21. Since none of the rinsing water flows into the sink itself, the washing liquid 23 having detergent therein remains clean and undiluted.

The bowl 11 and the conduit 12 are preferably made of plastic, the conduit 12 being sufficiently rigid to maintain the bowl above the closure means 17 but vertically offset therefrom as shown in FIGURE 1. The bushings and the flexible sealing disk or closure means 17 may be made of rubber, either natural or synthetic, or any other equivalent material.

Figure 2:
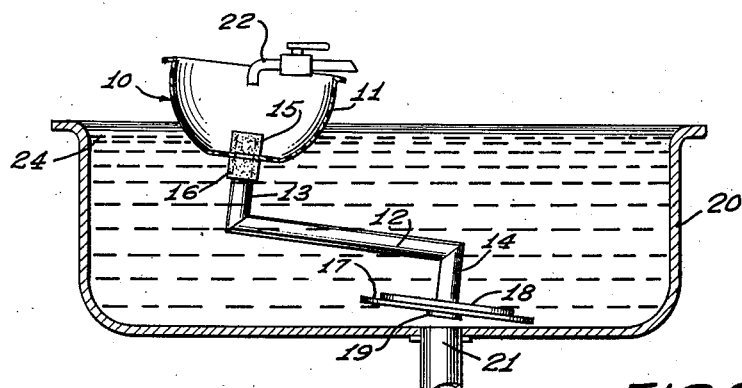
FIGURE 2 shows a diagrammatic vertical cross section showing the position of the attachment when the level of the water in the sink is increased sufficiently to float the bowl and thereby open the drain opening of the sink to prevent flooding.
Figure 3:
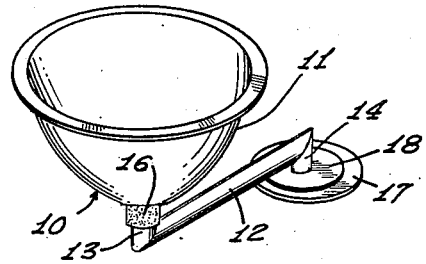
FIGURE 3 is a perspective view of the attachment of the present invention.

The bowl is preferably made of a plastic such as polyethylene which has a specific gravity less than that of water so that at least the bowl is buoyant. It will be appreciated that although the water which enters the bowl 11 will pass directly through conduit 12 into the drain opening, a certain amount of the rinsing water will splash out and into the sink itself. Furthermore, occasionally the faucet will be accidentally moved so that water will flow directly from the faucet into the sink. It is therefore apparent that when sufficient water enters the sink, the level of the water may approach the overflowing stage. Therefore, according to the present invention, when the bowl 11 is buoyant and the level of the water in the sink becomes dangerously high as indicated at 24 in FIGURE 2, the buoyant effect of the bowl will raise the bowl to tilt the attachment and raise the closure means 17 from about the drain opening to permit the water to run out of the sink and avoid flooding.

The length of the conduit 12 should be such that the entire attachment can be accommodated within a standard sink.

The sink attachment is positioned in the sink by positioning the closure plate 17 over the drain opening 21 and introducing water into the sink. The weight of the water holds the closure plate 17 in position over the drain opening to thereby seal the drain opening. In the event the water in the sink rises to a level sufficiently to float the bowl, the bowl is raised which causes separation of the closure plate 17 from the bottom of the sink near the drain opening. This does not completely separate the closure plate from the sink and therefore when sufficient water leaves the sink, the plate again becomes seated around the opening.

Preferably the upper free end of bushing 15 or portion 13 is spaced above the bottom of the bowl in order to maintain a small level of water in the bowl, the weight of the small level of water serving to stabilize the attachment and to reduce the buoyancy of the bowl.

I claim:
1. A rinsing device comprising in combination a sink or the like having a drain opening in the central portion of its bottom, a rinsing attachment comprising a substantially rigid conduit having a central generally horizontally extending branch with upwardly and downwardly extending branches respectively at the opposite ends of said horizontal branch, a buoyant bowl with its outside dimension greater than that of said conduit and fixedly secured to and in communication with the upper end of said upwardly extending branch and constituting both a float and a fluid inlet for said conduit, a substantially flat sealing plate secured to and surrounding the lower end of said downwardly extending branch, said plate being removably and rotatably received on said drain opening and establishing communication between said bowl and drain opening in all rotationally adjusted positions thereof, said sealing plate being substantially larger than said drain opening, said conduit comprising an offset lever connecting said bowl to said plate.

2. The combination of claim 1 wherein said upper end of said upwardly extending branch extends upwardly into said bowl and terminates above the bowl bottom wall.

3. The combination of claim 2 wherein said lower end of said downwardly extending branch projects downwardly beneath said plate for centering engagement in said drain opening.

4. The combination of claim 1 wherein said lower end of said downwardly extending branch projects downwardly beneath said plate for centering engagement in said drain opening.

5. The combination of claim 1 wherein at least the rim of said plate is flexible.

References Cited in the file of this patent
UNITED STATES PATENTS

| | | |
|---|---|---|
| 367,814 | Johnson | Aug. 9, 1887 |
| 426,939 | Jones | Apr. 29, 1890 |
| 435,674 | Barrett | Sept. 2, 1890 |
| 1,362,366 | Sundh | Dec. 14, 1920 |
| 2,065,347 | Schulse | Dec. 22, 1936 |
| 2,817,098 | Mustee | Dec. 24, 1957 |
| 2,988,755 | Roland | June 20, 1961 |